United States Patent
Mastie et al.

(10) Patent No.: US 7,312,902 B2
(45) Date of Patent: Dec. 25, 2007

(54) BACKGROUND DATA RECORDING AND USE WITH DOCUMENT PROCESSING

(75) Inventors: Scott D. Mastie, Longmont, CO (US); Joan L. Mitchell, Longmont, CO (US); Ravi Prakash, Concord, NC (US); Nenad Rijavec, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1049 days.

(21) Appl. No.: 10/428,711

(22) Filed: May 2, 2003

(65) Prior Publication Data
US 2004/0218799 A1    Nov. 4, 2004

(51) Int. Cl.
G06K 15/02 (2006.01)
G06K 9/46 (2006.01)
H04N 1/41 (2006.01)
H04N 1/38 (2006.01)
B41M 3/10 (2006.01)

(52) U.S. Cl. .................. 358/3.28; 358/1.16; 358/1.18; 358/403; 358/464; 382/137; 382/190; 340/5.86

(58) Field of Classification Search ................ 358/1.9, 358/3.28, 1.15–1.18, 463, 426.01, 426.04, 358/426.05, 426.12, 403, 464; 382/232, 382/137, 190; 340/5.86
See application file for complete search history.

(56) References Cited

U.S. PATENT DOCUMENTS 5,748,780 A * 5/1998 Stolfo ........................ 382/232

* cited by examiner

Primary Examiner—Scott A. Rogers
(74) Attorney, Agent, or Firm—Duft Bornsen & Fishman, LLP

(57) ABSTRACT

Systems, methods and program products for recording a document's background data during front-end generation of the document, and inserting a background data identifier on the document. In addition, the invention provides for use of the background data for document processing. For example, the invention provides for removal of the background data from scanner image data of the document to create a foreground image. The foreground image can be used to conduct processing relative to the document such as archiving, fraud detection and other processing. Background data recordation and removal during back-end processing results in improved archive accuracy, lowered storage size requirements, and reduced transmission costs. In addition, background data recordation allows referencing of a single background by a large number of documents.

23 Claims, 4 Drawing Sheets

BACKGROUND DATA RECORDING AND USE WITH DOCUMENT PROCESSING

This invention is related to co-pending application entitled "Joined Front-end and Back End Document Processing," U.S. Ser. No. 10/428,709, filed May 2, 2003.

BACKGROUND OF THE INVENTION

1. Technical Field

The present invention relates generally to document processing, and more particularly, to background data recording and use with document processing.

2. Related Art

Despite the evolution of electronic communications, the requirement of formalized documents as a communications medium remains in many industries. The content and layout of documents vary according to industry. For example, documents may include: correspondence, checks, orders, invoices, receipts, filled-out forms (e.g., insurance applications and completed tests), securities, etc. Processing of documents, however, has progressed such that many documents have a digital life in addition to a physical printed existence. In industries where a large number of documents are necessary, document processing management becomes very important. Document processing management can normally be broken into three stages: front-end generation of the document, usage of the document, and back-end processing of the used document. The substance of each stage may vary according to industry.

One problem with conventional approaches to document processing management is that front-end processing data is not used with back-end processing data. This may be the case even when the front-end document generating data exists in the same organization as the back-end processing. More often, however, the problem exists because the front-end and back-end processes do not exist in the same organization. For example, in the banking and finance industry, checks can be issued by a large number of institutions and cashed by an equally large and independent number of institutions. For the clearing of checks, banking institutions often overnight express CD-ROMs of the check images to their large commercial customers. Some institutions manually compare the checks to their text data. In this case, unless the cashing bank happened to have written the check, it is highly unlikely to have access to the front-end data used to print the document for detecting errors. There is no current service that generates checks and leverages the original data usable for printing to ensure the accuracy of the checks cashed by comparing each cashed check to the original check data.

One particular back-end process is archiving documents. The banking and finance industry is also a good example of where document archiving has a significant role. In this industry, important data such as customer statements or check images are usually archived. For example, millions of checks are processed every day in the United States. After being cleared, each check must be archived for seven years.

One persistent problem with back-end document processing, such as archiving, is obtaining an accurate image of a used document. Images for processing are conventionally made by scanning the document. For example, the front and back of checks are conventionally scanned and compressed. In many cases, both sides of the check are stored as grayscale images, which allows presenting a "reasonably accurate" image of the original. The front side of the check is also frequently stored as a "bilevel" image, i.e., a black and white image, which shows any handwritten text and any background data that is dark enough to register as black. "Background data" may include background images and layout matter such as text and/or layout objects that are provided on a document to provide the document's look-and-feel. In terms of a check, layout matter may include, for example, bank name, terms such as "Date" and "Pay to the Order of," routing number, account number, entry lines and boxes, etc. Archiving is especially problematic relative to inaccurate imaging because many used documents are destroyed after imaging.

Obtaining an accurate used document image has become increasingly difficult for many reasons. One reason is poor image quality. Another reason is the reduction in brightness disparities in documents created by backgrounds and lighter shade inks. For example, background images used on checks are becoming increasingly active, i.e., they contain more matter that registers as black in a bilevel image or a significantly dark object in a grayscale image. Accordingly, a background image may improperly register as significant information. Given the extremely wide variety of the possible document background images and ways that many documents can be preprinted and then filled out by hand, there is no reliable way of separating significant information from the relatively unimportant information. As a result, documents are processed as if everything on the document is important. This results in larger compressed image sizes, and increased storage and communication costs. An additional problem with background data is that it may also be hard to compress efficiently.

Relative to lighter shade inks, such as those available in gel pens, imaging may result in loss of significant information. For example, significant information written in a light shade ink may register as white in a bilevel image or a significantly light object in a grayscale image. For example, with regard to a check, the payee and amount may be handwritten with a light shade ink that makes the text un-discernable relative to the background data when scanned. This often results in significant information being lost. Again, this is especially problematic relative to archiving because many used printed documents are destroyed after imaging.

The inaccuracies described above could be remedied by knowing background data when conducting back-end processing. Unfortunately, no mechanisms exist for determining, recording and tracking background data, or for sharing this information with the back-end processing stage. Currently, activities such as 'form dropout' and 'form removal' are possible. In form dropout, the form (layout matter) is printed in a different ink than the rest of the document, and does not show up in the scanned document. In form removal, the form is scanned and stored as part of background processing and used to remove the form from the scanned document. In neither of these cases, however, is background data recorded at document generation. As a result, a document's background data is not known at the back-end processing stage, and documents are generally processed by ignoring the above-described imaging inaccuracies.

In view of the foregoing, there is a need in the art for background data recording during front-end document generation for use with back-end document processing

SUMMARY OF THE INVENTION

The invention provides systems, methods and program products for recording a document's background data at front-end generation of the document, and inserting a background data identifier on the document. In addition, the invention provides for use of the background data for document processing. For example, the invention provides for removal of the background data from scanner image data of the document to create a foreground image. The foreground image can be used to conduct processing relative to the document such as archiving, fraud detection and other processing. Background data recordation and removal during back-end processing results in improved archive accuracy, lowered storage size requirements, and reduced transmission costs. In addition, background data recordation allows referencing of a single background by a large number of documents.

A first aspect of the invention is directed to a method of processing a document that has been imaged after use to create image data, the method comprising the steps of: retrieving background data used on the document from a background data memory based on a background data identifier on the document; removing the background data from the image data to create a foreground image; and processing using the foreground image.

A second aspect of the invention is directed to a method of processing a document, the method comprising the steps of: generating the document; recording background data of the document in a background data memory; and inserting a background data identifier on the document that corresponds to the background data.

A third aspect of the invention is directed to a system for document processing, the system comprising: a front-end document generating system including: a printing system for printing a document; a background recorder for recording background data of the document in a background data memory; and a background data identifier inserter for inserting a background data identifier on the document that corresponds to the background data.

A fourth aspect of the invention is directed to a system for document processing, the system comprising: a back-end document processing system for processing a document after use including: an imager for imaging the document after use and creating image data thereof; a background data retriever for retrieving a background data of the document from a background data memory based on a background data identifier on the document; and a background data remover for removing the background data from the image data to create a foreground image.

A fifth aspect of the invention is directed to a computer program product comprising a computer useable medium having computer readable program code embodied therein for processing a document that has been imaged after use to create image data, the program product comprising: program code configured to retrieve a background data of the document from a background data memory based on a background data identifier on the document; program code configured to remove the background data from the image data to create a foreground image; and program code configured to conduct processing using the foreground image.

A sixth aspect of the invention is directed to a computer program product comprising a computer useable medium having computer readable program code embodied therein for processing a document, the program product comprising: program code configured to generate print data usable for printing the document; program code configured to record a background data of the document in a background data memory; and program code configured to insert a background data identifier on the document.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the following description includes the following headers: I. Document Processing Management Environment Overview; II. Front-end Document Generating System; III. Back-end Document Processing System; IV. Operation; and V. Conclusion.

I. Document Processing Management Environment Overview

Figure 1:
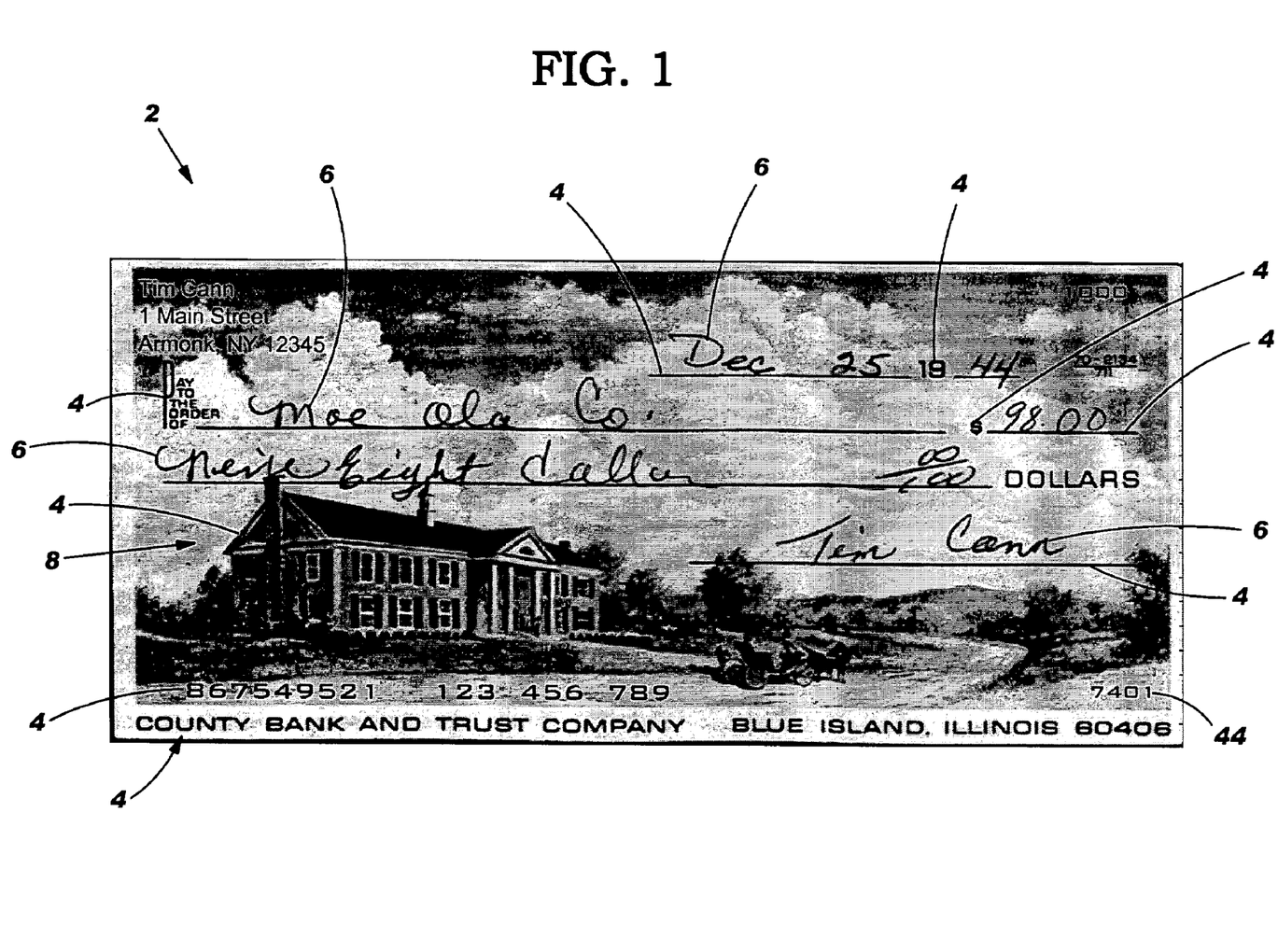
FIG. 1 shows an example document in the form of a check.

With reference to the accompanying drawings, FIG. 1 shows an example document 2 to be processed in the form of a personal check. A document may include content 6 and background data. "Background data" may include a background image(s) 8 or layout matter 4, or a combination thereof. As noted above, "layout matter" includes text and/or layout objects that are provided on a document to provide the document's look-and-feel. In terms of the check, layout matter may include, for example, bank name (e.g., County Bank and Trust Company), terms such as "Date" and "Pay to the Order of," routing number (e.g., 867549521), account number (e.g., 123 456 789), payer name (e.g., Tim Cann), entry lines and boxes, etc. "Content" is any matter on the document that is specific to the individual document's use. In the example shown, content 6 includes the handwritten insertion of payee name (e.g., "Moe Ola Co."), date (e.g., "December 25" and "44"), check amount (e.g., "98.00" or "Ninety Eight dollars") and signature, and the printed check number (e.g., 1000). "Background image" 8 is anything provided that does not constitute layout matter 4 or content 6. Background image 8, in the example shown, includes a landscape picture including a house and surrounding area. It should be recognized that background data may take a variety of forms not shown, and may contain any number of layers. Background data may include, for example: image(s), pattern(s), hatching, shading, half-tones, or a combination thereof. Layout matter 4 may or may not be considered part of background data. For purposes of description, however, the invention will be described as though layout matter is background data except where advantageous to distinguish.

Figure 2:
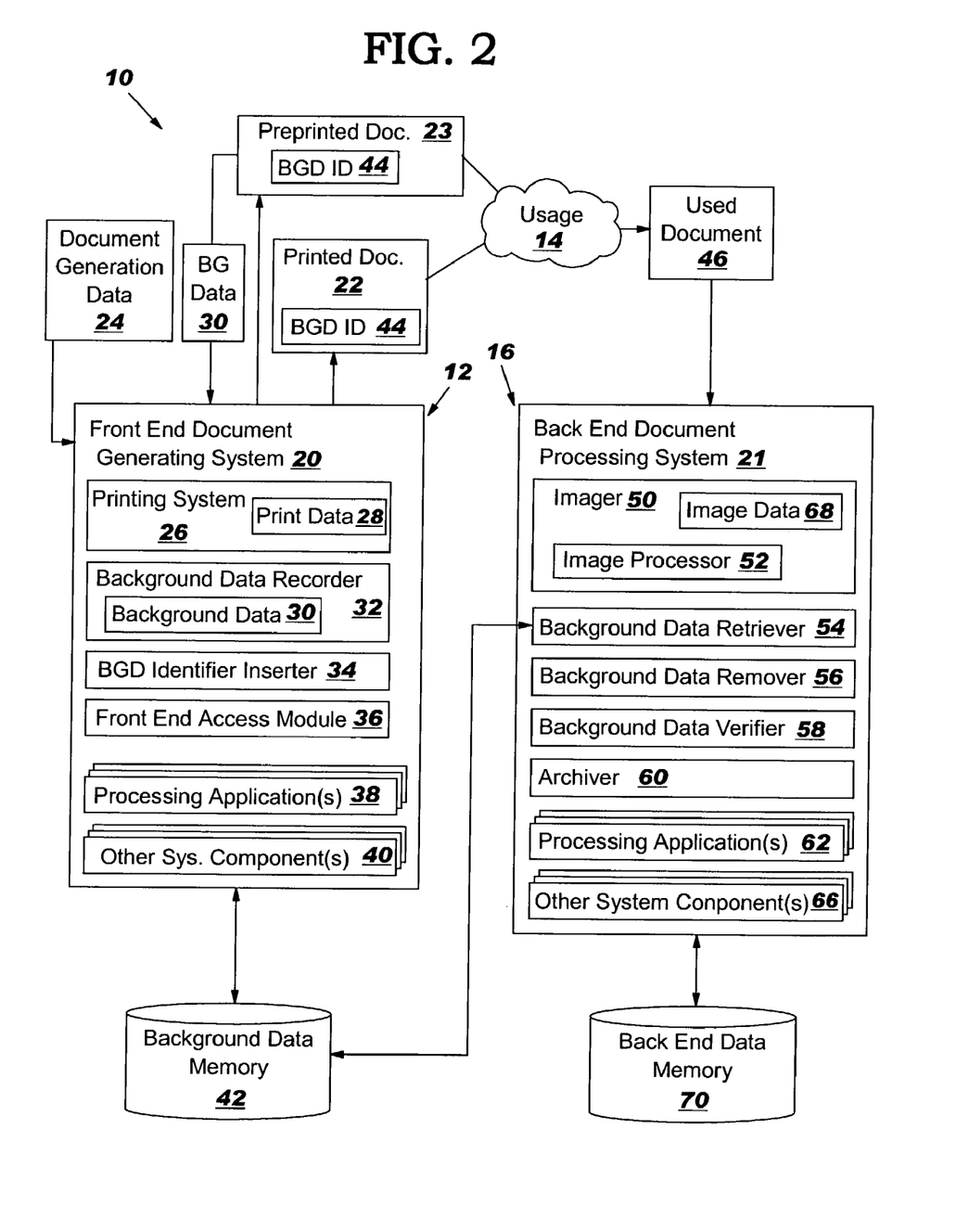
FIG. 2 shows a block diagram illustrating a document processing management environment according to the invention.

FIG. 2 shows a block diagram illustrating a document processing management environment 10 of the invention. Document processing management environment 10 generally includes three stages: the front-end generation stage 12, usage of document stage 14, and the back-end processing of the used document stage 16. Processing of two types of documents can be managed: a "printed document" 22 and a "preprinted document" 23. Where necessary, the description that follows will refer to the individual type of document. Otherwise, these documents shall be referred to herein collectively as "documents" or "a document." As used herein, a "printed document" 22 is a complete document in which all matter on the document is generated at generation stage 12. In contrast, a "preprinted document" 23 is a complete document in which some matter on the document is generated prior to generation stage 12. A preprinted document 23 may take at least two forms: First, preprinted document 23 may include a complete document that is generated with preprinted matter in the form of a background image 8 (FIG. 1) only, e.g., a background image as provided on a paper stock. Second, preprinted document 23 may include a completed document that is generated with preprinted matter in the form of a background image 8 (FIG. 1) and layout matter 4 (FIG. 1). In this case, only content 6 (FIG. 1) is added by a user, e.g., by handwriting or by printing onto the preprinted document. Referring to FIG. 1, document 2 in the form of a personal check is a preprinted document having its layout matter 4 and background image 8 preprinted, and its content 6 handwritten thereon. A printed document 22 (FIG. 2) of a personal check would look fairly similar to that shown in FIG. 1, except content 6 would also be printed. While the invention will be explained herein with reference to the personal handwritten check, it should be recognized that a personal handwritten check is only illustrative and that the invention applies to any variety of document, e.g., with or without handwritten matter.

Returning to FIG. 2, the general movement of a document in environment 10 includes generation of a document 22, 23 at front-end generation stage 12 by a front-end document generating system 20, usage of document 22, 23 by a user at usage stage 14, and then processing at back-end processing stage 16 by a back-end document processing system 21. With special regard to preprinted documents 23, such as the personal check shown in FIG. 1, document generating system 20 may be embodied by a user handwriting or printing content 6 (FIG. 1) into preprinted document 23. In this case, as will be explained in more detail below, generating system 20 may be provided with background data 30 used on preprinted documents 23 for recordation so they can be processed as though they originated therein. Processing may also occur at generating system 20, if desired. Each system 20, 21 will be described in greater detail below. The substance of each stage varies depending on industry. As an overview, the invention captures electronically and saves print data 28 used to print a document 22, i.e., at stage 12. Co-pending US patent application entitled "Joined Front-end and Back-end Document Processing," incorporated by reference herein, describes how back-end processing stage 16 can use print data 28 with image data 68 that is obtained when a used document 46 is scanned. The invention described herein records background data 30 used on a document 22, 23, or is provided with background data 30 used on preprinted document 23 for recordation thereof at front-end generation stage 12. Background data 30 may be used with back-end processing stage 16, for example, by removing background data 30 from image data 68 to leave only a foreground image.

Referring to usage stage 14, the stage may include simple transfer of a document, or may include filling in blank spaces, marking up the document, adding signatures and/or stamps, and/or otherwise altering the document.

II. Front-End Document Generating System

As noted above, at generation stage 12, a front-end document generation system 20 (hereinafter "generating system 20") is provided to generate an original printed document 22 and/or a preprinted document 23. It should be recognized that while one generating system 20 has been illustrated, that a number of generating systems 20 may exist within environment 10. For example, in the banking and finance industry, a number of check writing entities such as individuals, corporations, payroll management companies, e.g., Paychex®, etc., exist.

Document generation data 24 is used to build a document, and may take different forms depending on whether the document is a printed document 22 or a preprinted document 23. In terms of a printed document 22, document generation data 24 may exist as a variety of text data (e.g., ASCII), graphics, and base images that are combined to form the entire printed document 22. In terms of a check, document generation data 24 may include, for example: text data such as a check amount, date, bank name, payer, payee, etc.; graphics data such as a verifying watermark, bank logo, insertion lines or boxes, etc.; and base images such as a background image or other image(s). In terms of a preprinted document 23, document generation data 24 may simply include content 6 (FIG. 1) to be printed, or handwritten, on a preprinted document 23 that includes layout matter 4 (FIG. 1) and background image 8 (FIG. 1). Alternatively, in terms of a preprinted document 23 that includes only a background image 8 (FIG. 1), document generation data 24 may include layout matter 4 (FIG. 1) (i.e., further background data) and content 6 (FIG. 1). As known in the art, document generation data 24 may be extracted from multiple databases (not shown) when in electronic form.

Generating system 20 includes a printing system 26, a background recorder 32, a BGD identifier inserter 34, a front-end access module 36, processing application(s) 38 and other system component(s) 40. Printing system 26 includes any now known or later developed mechanisms for generating print data 28 that is usable for printing a document 22, 23. Printing system 26 may include mechanisms to actually print document 22, or may include a processor(s) to generate print data 28 without actually printing the document. Accordingly, print data 28 does not necessarily need to be used to actually print a document. "Print data" is any data generated by printing system 26 usable for physically generating printed document 22 including data that is normally only stored temporarily or non-persistently, e.g., pixel data in a print buffer. That is, print data 28 includes print-ready data including at least one of image data, pixel data (aka pels) and language data that is transformed from document generation data 24 (raw data) by printing system 26. Print data 28 may be in any format desired, e.g., IBM's Mixed Object Document Content Architecture (MO:DCA). Print data 28 may include data to print everything on printed document 22, or data to print certain things on a preprinted document 23. Where a preprinted document 23 includes all background data (e.g., layout matter 4, background image 8 or a combination thereof as illustrated in FIG. 1), printing system 26 may be used to fill out the document with content. Alternatively, where a preprinted document 23 includes background data (e.g., layout matter 4, background image 8 or a combination thereof (FIG. 1)) and content 6 (FIG. 1) is filled in, for example, by handwriting, generating system 20 may not be used other than as a background data recorder, as will be described below. In these cases, although a preprinted document 23 is not printed by printing system 26, generating system 20 may also be used to insert a background data identifier(s), as will also be described below.

Background data recorder 32 (hereinafter "BGD recorder 32") is configured to determine and save background data 30 used on a respective printed document 22. In terms of a preprinted document 23 that is not entirely generated by generating system 20, BGD recorder 30 may be used to determine (i.e., be provided with) and save background data 30. Background data 30 may be saved, for example, in a background data memory 42. Memory 42 may comprise any now known or later developed data storage system and/or transmission media, including magnetic media, optical media, random access memory (RAM), read only memory (ROM), a data object, etc. Moreover, memory 42 may reside at a single physical location comprising one or more types of data storage, or be distributed across a plurality of physical systems.

Background data 30 used on a document 22, 23 may be determined by BGD recorder 32 in a number of ways depending on the type of document 22, 23. First, background data 30 may be known based on the paper stock used for a partially preprinted document 23, i.e., one that includes only a background image and, perhaps, some layout matter. For example, a number of check writing entities such as Paychex® use a particular paper stock(s) having counterfeiting prevention background images thereon. From this information, background data 30 can be easily ascertained. Second, document generation data 24 may include background data 30 to be printed with a printed document 22, e.g., layout matter, background image, shading or a combination thereof. Third, where background data 30 is not explicitly known at generation stage 16, it may be determined by knowing the content to be inserted in a printed document 22. In this case, anything that is not content is considered background data. Fourth, where, for example, a preprinted document 23 has content and background data inserted therein outside the parameters of generating system 20, background data 30 may be provided to generating system 20 for recordation and/or insertion of a background data identifier. This may be the case for the handwritten personal check shown in FIG. 1.

Once BGD recorder 32 determines background data of a document 22, 23, an association of background data 30 with document 22, 23 is saved in background data memory 42. Association is made via use of a background data identifier(s) 44 on a document 22, 23. Implementation of a background data identifier(s) 44, allows association of a single, saved background data 30 with a large number of documents 22, 23 for reduced data storage (i.e., background data is saved once), and easy retrieval. Association may be either explicit or implicit. Implicit association denotes that a background data identifier 44 is inconspicuously incorporated in document 22, 23. For example, the date that a printed document 22 was printed may be a background data identifier 44. In another example, layout matter may provide a background data identifier 44, e.g., for a check: a routing number and/or an account number. This may be the case for a preprinted document 23 in the form of a personal handwritten check (FIG. 1). As another example, imaging and optical character recognition (OCR) of preprinted text could provide a background data identifier 44. In any case, a background data identifier 44 is easily attainable by imaging a used document 46 (FIG. 2), especially if magnetic ink character recognition (MICR) toner is used.

In terms of an explicit association, a background data identifier inserter 34 ("BGD identifier inserter" in FIG. 2) may be provided to physically insert a background data identifier(s) 44 into a document 22, 23. In one embodiment, shown in FIG. 1, background data identifier 44 may be text that identifies corresponding background data 30. In an alternative embodiment, a digital watermark can be printed on document 22, 23 or embedded in the preprinted background data 30 to identify the background. As known to those in the art, there are a variety of mechanisms for generating watermarks that are invisible to the human eye, but will survive scanning and lossy compression. A background data identifier 44 may be used alone or in combination with other background data identifier(s) 44.

Front-end access module 36 includes any hardware and/or software configured to make background data memory 42 accessible to back-end document processing system 21. Front-end access module 36 may include, for example, a security login package for generation system 20 and/or background data memory 42, an encryption key supplier so data is transmitted securely, sending third party destination information if the front-end and back-end processing is to be handled elsewhere, etc. Processing application(s) 38 may provide a variety of mechanisms to process documents 22, 23 and/or a used document 46 when data collected at processing system 21 is communicated to generating system 20. Other system components 40 may provide any other functionality now known or later developed for document generating system 20 or ancillary services. One illustrative other system component 40 may be a digital compression package for print data 28 and/or background image(s) 30.

It should be recognized that generating system 20 may take a variety of forms beyond a system that simply generates documents. For instance, generating system 20 may take the form of a point-of-sale terminal that prints receipts and stores print data 28 and background data 30 about the receipts.

III. Back-end Document Processing System

Back-end document processing system 21 (hereinafter "processing system 21") is designed to receive a used document 46 after usage stage 14, and conduct any of a variety of processing tasks on, or based on, used document 46. It should be recognized that while one processing system 21 has been illustrated, that a number of processing systems 21 may exist within environment 10. For example, in the banking and finance industry, a number of banks exist that each receive checks from any check writing entities such as individuals, corporations, payroll management companies such as Paychex®, etc. In this industry, each bank may represent a processing system 21.

Each processing system 21 includes: an imager 50 including an image processor 52, a background data retriever 54, a background data remover 56, a background data verifier 58, an archiver 60, at least one (and usually a variety of) processing application(s) 62, and any now known or later developed other system components 66 used for processing used documents. Imager 50 is configured to receive a used document 46 and create an image thereof by scanning used document 46. The image, parts thereof or processed portion(s) of the image are referred to herein as "image data" 68. Image data 68 may be stored in back-end data memory 70. As with background data memory 42, back-end data memory 70 may comprise any now known or later developed data storage system and/or transmission media, including magnetic media, optical media, random access memory (RAM), read only memory (ROM), a data object, etc., and may reside at a single physical location comprising one or more types of data storage, or be distributed across a plurality of physical systems. It should be recognized that if image data 68 is available without the need for an imager 50, then imager 50 may be omitted.

Image processor 52 is capable of conducting any image data-related processing of the image such as optical character recognition (OCR), rotation correction, image aliasing correction, error correction, image size scaling, thresholding to convert binary image, converting to a binary image to a smaller grayscale image, color space conversion, magnetic ink character recognition (MICR), etc. This information may then be stored as image data 68. Background data retriever 54 includes any hardware and/or software configured to evaluate image data 68 to determine/find background identifier(s) 44, and retrieve corresponding background data 30 from background data memory 42 based on background data identifier(s) 44 on used document 46. As discussed above, background data identifier(s) 44 may be explicit such as text or a watermark, or implicit in other data (e.g., for a check: date, routing, account and/or check number). Once background data identifier(s) 44 has been determined, background data retriever 54 retrieves corresponding background data 30. In this regard, background data retriever 54 may include a mechanism(s) to access background data 30 in background data memory 42 and/or generating system 20. Background data retriever 54 may include, for example, security login package for generating system 20 and/or background data memory 42, an encryption key supplier so data is transmitted securely, sending third party destination information if the front-end and back-end processing is to be handled elsewhere, etc.

Once background data 30 has been retrieved, it may be verified by a background data verifier 56 by comparing image data 68, which contains background data along with everything else on used document 46, with the retrieved background data 30. If, for any reason, background data 30 cannot be reliably identified or verified on a particular used document 46, then processing using the retrieved background data 30 may be avoided and the document can be processed and stored in a conventional manner.

Figure 3:
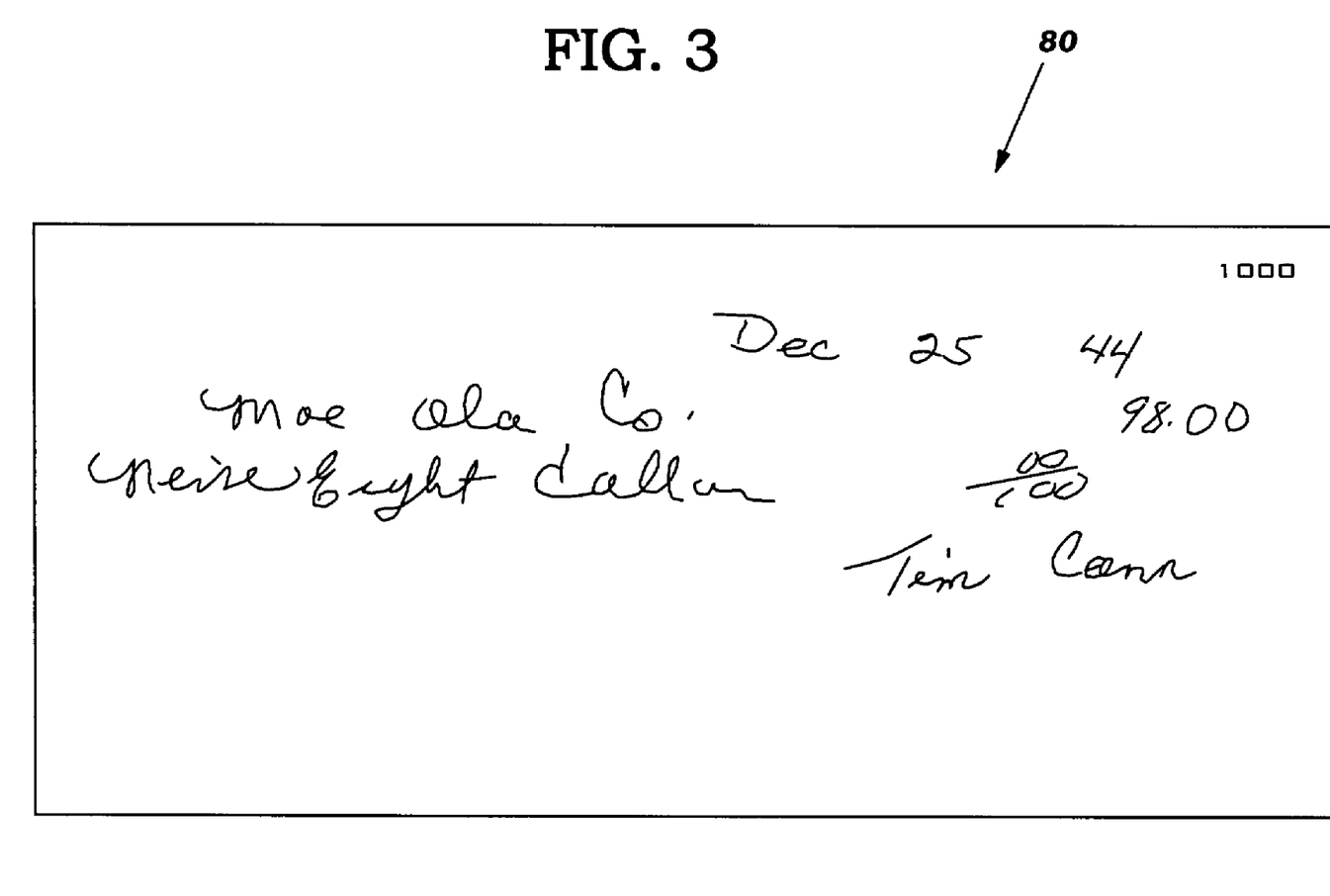
FIG. 3 shows an example foreground image of the check of FIG. 1 with background data removed.

With regard to background data remover 56, after background data 30 used in a used document 46 has been identified and/or verified, it can be removed from image data 68 to create a foreground image. An illustrative foreground image 80 of the personal check shown in FIG. 1 is shown in FIG. 3. Foreground image 80 includes everything on document 2 except for background data 30. In the example of FIG. 3, background data 30 includes layout matter 4 (FIG. 1) and background image 8 (FIG. 1), so what remains is content 6 (FIG. 1). The content for a handwritten personal check includes the handwritten insertion of payee name (e.g., "Moe Ola Co."), date (e.g., "December 25" 19"44"), check amount (e.g., "98.00" or "Ninety Eight dollars 00/100") and signature, and the printed check number (e.g., 1000). If background data 30 did not include layout matter 4 (FIG. 1), then layout matter 4 (FIG. 1) would also be part of foreground image 80. In the case of a check, layout matter 4 (FIG. 1) includes, for example, bank name (e.g., County Bank and Trust Company), terms such as "Date" and "Pay to the Order of," routing number (e.g., 867549521), account number (e.g., 123 456 789), payer name (e.g., Tim Cann), entry lines and boxes, etc.

Foreground image 80 can be saved using archiver 60. Background data 30 may also be saved with image data 68 in back-end data memory 70, if desired, using archiver 60. With special regard to archiver 60 and use with checks, instead of saving both sides of the check as grayscale, only image data 68 without the background data on each side can be archived, together with background data identifier(s) 44. This technique reduces data storage requirements, especially where only a few background images and layouts are used by a large number of checks. As an option, "imaging settings," describing the scanning process that was used by imager 50, may also be saved by archiver 60 so that used document 46 can be rebuilt, if necessary. In this case, appropriate background data 30 can be retrieved from back-end data memory 70 or background data memory 42, modified based on the imaging settings and joined with image data 68 that does not include the background data. Since the retrieved background data used to rebuild used document 46 has not been actually scanned, the reconstructed used document 46 should have better quality than conventionally scanned used documents. In addition, being able to retrieve background data 30 allows for creation of a 'family' of related re-creations including, for example: foreground image 80 only, foreground image 80 with background data 30 as retrieved and added to foreground image 80, and/or foreground and background as imaged.

Processing application(s) 62 provide any of a variety of industry-specific document processing or analysis tools. For example, processing system 21, via processing application(s) 62, can process using print data 28 and image data 68 as described in co-pending U.S. Ser. No. 10/428,709. It should be recognized that while processing applications 62 are part of processing system 21, that data can be communicated to generating system 20 and processing applications 38 therein can be used to provide the same functionality, and vice versa. Illustrative processing application(s) 62 include mechanisms for investigating tampering of used document 46, fraud detection and forgery detection. For example, for commercial checks, the payee and amount can be OCR-ed and compared to print data 28 (FIG. 2) of the originally printed check to detect if any changes have been made. Other industries may carry out other processes.

With regard to background data memory 42 and back-end data memory 70, it should be recognized that memory 42 can be located at generating system 20 location(s) and accessed when needed by background data retriever 54 of processing system 21. Similarly, memory 70 can be located at processing system 21 location(s) and accessed when needed by generating system 20. Alternatively, a packet of background data 30 may be communicated to a processing system 21 for comparison to image data 68 stored in back-end data memory 70. Similarly, a packet of image data 68 may be communicated to a generating system 20 for comparison to background data 30 stored in background image memory 42. In another example, a third party(ies) may be implemented to collect data from any number of generating system(s) 20 and/or processing system(s) 21 and control accessibility to the data. For example, document generation could occur at a number of generating systems 20, e.g., in facsimile machines, at multiple vendor printers, or at multiple local printers. This front-end data could be collected into a single source by a third party, and thereby made easily accessible to processing system(s) 21. A document may include embedded therein information about where to find the original printed document's electronic version. Collection of data may also occur in reverse relative to an environment having a number of processing systems 21 for easy access by generating system(s) 20. In any case, the "original" front-end print data 28 and background data 30 is made available for processing with image data 68.

Other system components 66 provided at processing system 21 may include, for example, a sorting mechanism.

IV. Operation

Figure 4:
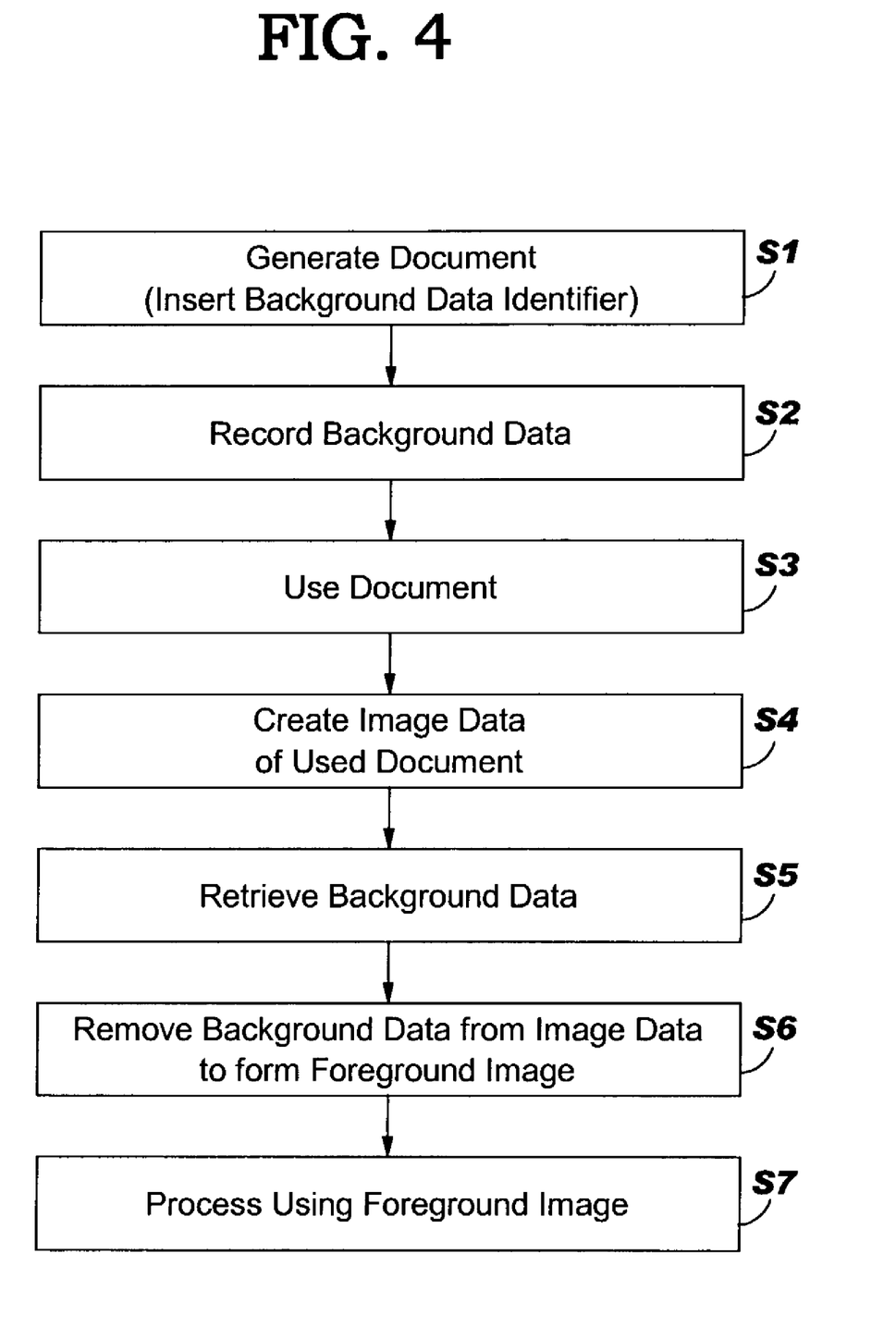
FIG. 4 shows a flow diagram of document process management according to the invention.

Referring to FIGS. 2 and 4 in combination, document processing management according to the invention will now be described. Steps S1-S2 represent processes that take place at a front-end generating stage 12. In step S1, a document 22, 23 may be generated, e.g., has print data 28 generated (not actually printed), is actually printed by printing system 26, filled in by a user, etc. This step may optionally include inserting a background data identifier(s) 44 into document 22, 23. Background data identifier(s) 44 may include, for example, at least one of a watermark, text on the document or a combination thereof. Each background data identifier 44 is indexed relative to corresponding background data 30. In step S2, background data 30 of document 22, 23 is recorded in background data memory 42 by background data recorder 32 along with corresponding background data identifier(s) 44.

In step S3, document 22, 23 is used for its intended purpose, i.e., at usage stage 14. In terms of a check, the check would be sent to the payee and taken to his/her bank for cashing.

Steps S4-S7 represent processes that take place after usage stage 14, e.g., at back-end processing stage 16. In step S4, used document 46 is imaged by imager 50 to create image data 68, which may be saved. In terms of a check, the receiving bank would image the check to create image data 68 thereof. The imaging step may also include conducting image processing such as optical character recognition using image processor 52.

In step S5, background data 30 of used document 46 is retrieved by background data retriever 54 from background data memory 42 based on a background data identifier 44 used on the document. In step S6, background data 30 is removed from image data 68 by background data remover 56 to create foreground data 80 (FIG. 3). This step may also include saving foreground data 80 using archiver 60. In step S7, processing using foreground data 80 is conducted. One example processing step may include archiving foreground data 80, perhaps with imaging settings used during step S4 for use with later re-building of used document 46. Other processing steps are also possible.

V. CONCLUSION

In the previous discussion, it will be understood that the method steps discussed are performed by a processor, such as central processing unit of system 20 or 21, executing instructions of program product stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of processing a document that has been imaged after use, the method comprising the steps of:
   imaging the document to generate the image data representing the document, the image data including background data of the document and content of the document;
   identifying a background data identifier on the document;
   retrieving stored background data of the document from a background data memory based on the background data identifier;
   removing the background data from the image data using the stored background data to create a foreground image, the foreground image including the content of the document;
   retrieving print data utilized to generate the document; and
   verifying the content of the foreground image by comparing the content with the print data.

2. The method of claim 1,
   wherein the print data further comprises the stored background data.

3. The method of claim 1, wherein the background data identifier includes at least one of: a watermark on the document and text on the document, wherein the background data identifier is indexed relative to the background data.

4. The method of claim 1, wherein the processing step includes archiving the foreground image.

5. The method of claim 4, further comprising the step of archiving imaging settings used during imaging of the document.

6. A method of processing a document, the method comprising the steps of:
   generating the document utilizing print data, the print data comprising content of the document;
   recording background data of the document in a background data memory;
   storing the print data in the background data memory; and
   inserting a background data identifier on the document that corresponds to the background data.

7. The method of claim 6, further comprising conducting the following steps at a document processing system:
   imaging the document after use to generate the image data representing the document, the image data including the background data of the document and the content of the document;
   identifying the background data identifier on the document;
   retrieving the stored background data from the background data memory based on the background data identifier on the document;
   removing the background data from the image data using the stored background data to create a foreground image, the foreground image including the content of the document;
   retrieving print data utilized to generate the document; and verifying the content of the foreground image by comparing the content with the print data.

8. The method of claim 7, wherein the processing step includes archiving the foreground image.

9. The method of claim 8, further comprising the step of archiving imaging settings with the foreground image.

10. The method of claim 6, wherein the background data identifier includes at least one of: a watermark on the document and text on the document, wherein the background data identifier is indexed relative to the background data.

11. A system for document processing, the system comprising:
a front-end document generating system including:
   a panting system for printing a document utilizing print data, the print data comprising content of the document;
   a background recorder for recording background data of the document in a background data memory; and
   a background data identifier inserter for inserting a background data identifier on the document that corresponds to the background data.

12. The system of claim 11, wherein the front-end document generating system further includes a front-end access module for making the background data memory accessible to a back-end document processing system.

13. The system of claim 11, farther comprising a back-end document processing system for processing the document after use, the back-end document processing system comprising:
   an imager for imaging the document after use and generating the image data representing the document, the image data including background data of the document and content of the document;
   a background data retriever for identifying the background data identifier on the document and for retrieving the stored background data from the background data memory based on the background data identifier on the document;
   a background remover for removing the background data from the image data using the stored background data to create a foreground image, the foreground image including the content of the document and
   a processing application for retrieving print data utilized to generate the document and for verifying the content of the foreground image by comparing the content with the print data.

14. The system of claim 13, wherein the back-end processing system further comprises an archiver for saving the foreground image.

15. A system for document processing, the system comprising:
a back-end document processing system for processing a document after use including:
   an imager for imaging the document after use and generating the image data representing the document, the image data including background data of the document and content of the document;
   a background data retriever for identifying the background data identifier on the document and for retrieving the stored background data from the background data memory based on the background data identifier on the document;
   a background remover for removing the background data from the image data using the stored background data to create a foreground image, the foreground image including the content of the document; and
   a processing application for retrieving print data utilized to generate the document and for verifying the content of the foreground image by comparing the content with the print data.

16. The system of claim 15, further comprising:
a front-end document generating system including:
   a printing system for printing a document utilizing print data, the print data comprising content of the document;
   a background recorder for recording background data of the document in a background data memory; and
   a background data identifier inserter for inserting a background data identifier on the document that corresponds to the background data.

17. The system of claim 16, wherein the front-end document generating system further includes a front-end access module for making the background data memory accessible to the back-end document processing system.

18. The system of claim 15, wherein the back-end processing system further comprises an archiver for saving the foreground image.

19. A computer program product comprising a computer useable medium having computer readable program code embodied therein for processing a document that has been imaged after use to create image data, the program product comprising:
   program code configured to image the document to generate the image data representing the document, the image data including background data of the document and content of the document;
   program code configured to identify a background data identifier on the document;
   program code configured to retrieve stored background data of the document from a background data memory based on the background data identifier on the document;
   program code configured to remove the background data from the image data using the stored background data to create a foreground image, the foreground image including the content of the document;
   program code configured to retrieve print data utilized to generate the document; and
   program code configured to verify the content of the foreground image by comparing the content with the print data.

20. The program product of claim 19, further comprising:
   program code configured to record the background data used on the document in the background data memory; and
   program code configured to insert the background data identifier on the document.

21. A computer program product comprising a computer useable medium having computer readable program code embodied therein for processing a document, the program product comprising:
   program code configured to generate print data usable for printing the document, the print data comprising content of the document;
   program code configured to record a background data of the document in a background data memory;
   program code configured to store the print data in the background data memory; and
   program code configured to insert a background data identifier on the document.

22. The program product of claim 21, further comprising:
program code configured to image the document to generate the image data representing the document, the image data including background data of the document and content of the document;
program code configured to identify a background data identifier on the document;
program code configured to retrieve stored background data of the document from a background data memory based on the background data identifier on the document;
program code configured to remove the background data from the image data using the stored background data to create a foreground image, the foreground image including the content of the document;
program code configured to retrieve print data utilized to generate the document; and
program code configured to verify the content of the foreground image by comparing the content with the print data.

23. The program product of claim 22, further comprising program code configured to archive the foreground image.

* * * * *

UNITED STATES PATENT AND TRADEMARK OFFICE
CERTIFICATE OF CORRECTION

| | |
|---|---|
| PATENT NO. | : 7,312,902 B2 |
| APPLICATION NO. | : 10/428711 |
| DATED | : December 25, 2007 |
| INVENTOR(S) | : Mastie et al. |

It is certified that error appears in the above-identified patent and that said Letters Patent is hereby corrected as shown below:

In Claim 11, column 13, line 16, should read as follows:

"a <u>printing</u> system for printing a document utilizing print"

Signed and Sealed this

Tenth Day of June, 2008

JON W. DUDAS
*Director of the United States Patent and Trademark Office*